United States Patent [19]

Peterson

[11] Patent Number: 4,982,145
[45] Date of Patent: Jan. 1, 1991

[54] METHOD AND APPARATUS FOR THE OPTIMIZATION OF THYRISTOR POWER SUPPLY TRANSPORT TIME DELAY

[75] Inventor: Robert S. Peterson, Indiana Township, Allegheny County, Pa.

[73] Assignee: AEG Westinghouse Industrial Automation Corporation, Somerville, N.J.

[21] Appl. No.: 404,393

[22] Filed: Sep. 8, 1989

[51] Int. Cl.⁵ .................... G05B 11/16; G05B 11/36
[52] U.S. Cl. .................... 318/594; 318/596; 318/609; 318/799; 318/561; 363/96; 388/810; 388/813
[58] Field of Search .......... 318/561, 567, 569, 592, 318/594, 596, 600, 609, 628, 799, 800, 812, 445, 448, 452, 453, 454, 455, 484; 363/96; 388/806, 810, 813, 815

[56] References Cited

U.S. PATENT DOCUMENTS

| | | | |
|---|---|---|---|
| 3,950,684 | 4/1976 | Peterson | 388/806 |
| 3,983,464 | 9/1976 | Peterson | 388/823 |
| 4,195,336 | 3/1980 | Kalinichenko | 363/96 X |
| 4,451,771 | 5/1984 | Nagase et al. | 318/799 X |
| 4,451,878 | 5/1984 | Shigemasa | 364/151 |
| 4,539,633 | 9/1985 | Shigemasa et al. | 364/162 |
| 4,577,269 | 3/1986 | Abbondanti | 388/810 X |
| 4,695,780 | 9/1987 | Kurakake et al. | 318/561 |
| 4,710,692 | 12/1987 | Libert et al. | 318/729 |
| 4,806,836 | 2/1989 | Webb | 318/609 |

Primary Examiner—Bentsu Ro
Attorney, Agent, or Firm—Richard V. Westerhoff; Suzanne Kikel

[57] ABSTRACT

A digital current control arrangement for optimizing the transport time delay of a thyristor power supply used as a source of armature current for a DC motor utilizes a coarse gate angle interrupt subroutine to perform a preliminary calculation of the gate firing angle for the next thyristor to be fired. The coarse gate angle calculation is performed at a predetermined time following the firing of a previous thyristor. A finite gate angle interrupt subroutine is also provided for recalculating the gate firing angle at a second predetermined time just prior to the firing of the thyristor. The finite and coarse gate angle interrupt subroutines both perform their respective calculations using the common parameters. A flag passing arrangement is also included in the current control arrangement and is effective to insure that the finite gate firing angle is the preferred calculation used in the firing of the next thyristor.

17 Claims, 6 Drawing Sheets

METHOD AND APPARATUS FOR THE OPTIMIZATION OF THYRISTOR POWER SUPPLY TRANSPORT TIME DELAY

FIELD OF THE INVENTION

This invention relates to a method and apparatus for optimizing the transport time delay associated with a thyristor power supply. More particularly, this invention relates to such a thyristor transport time delay optimizing arrangement as utilizes a microprocessor digital drive control system having a coarse gate angle and a finite gate angle interrupt control scheme.

BACKGROUND OF THE INVENTION

In a drive control system as may be used in an industrial application requiring the precise control of motor performance, it is known that the transport time delay associated with the thyristor power supply that supplies armature current to the DC motor is the limiting factor which determines how fast the current regulator system can be made. It should be noted that the transport time delay is defined as the time between gating the thyristors and updating the speed controller whether it is a microprocessor or analog type of control system. If a motor armature current regulator is slow, its performance will be erratic, which results in excessive current limit overshoot and can even cause speed regulator instability. It can be appreciated that in an industrial application such as a steel rolling mill where a drive system must control the speed of the rollers for instance, it is essential to have a precise and timely response to speed regulation in order to ensure that the proper gauge and thickness of the steel slab is being maintained. Other industrial applications such as an automated assembly line have similar drive control system considerations as well.

In an analog-based speed control arrangement for a DC motor drive, energy is provided to the armature of the motor by a thyristor power supply. With this configuration, there can be a high armature current rate change when the thyristor power supply goes through zero current in connection with a current reversal. Additionally, it is known that this high armature current rate change can adversely effect the DC motor and can also result in drive speed regulator oscillations. Such conditions can arise in analog speed control arrangement which utilizes proportional integrator squared (PI)$^2$ control characteristics; an example of such an arrangement can be found in U.S. Pat. No. 3,983,464 which issued on Sept. 28, 1976 to the same inventor as the present invention. Another example of a speed control arrangement for a DC motor can be found in U.S. Pat. No. 3,950,684 which issued on Apr. 13, 1976 to same inventor as the present invention.

In a conventional analog speed control arrangement, there is typically a continuous updating of the speed control components until the instant that the thyristors are gated. Although it would seem that the transport time delay under these circumstances would be the time between two successive thyristor gatings, in actuality, this time is typically on the order of 0.4 msec. If such time delay were the time between two successive thyristor gatings, the value for a six pulse, 60 Hz thyristor power supply would be $(1/60)(1/6) = 2.78$ msec. This distinction comes about as a result of the continuous updating between the two successive thyristor gatings; the speed controller sees a transport time delay of 2.78 msec just after gating and a transport time delay of 0.0 msec just prior to gating where the statistical transport time delay used for purposes of controller feedback loop analysis is approximately 0.4 msec.

The transport time delay is more well defined in a microprocessor based digital speed control arrangement; typically in this configuration, the microprocessor would be updated in fixed time intervals of 2.78 msec for a six pulse, 60 Hz system. Since the transport time delay is defined as the time between gating the thyristors and updating the digital speed controller, if the thyristor gate angle is being phased "on", the transport time delay will initially decrease and conversely, if the gate angle is being phased "back", the transport time delay will initially increase. Additionally, since the microprocessor clock is not synchronized to the gating of the thyristor, this condition will further add to the variation of the transport time delay. The resultant effect of such performance characteristics is that the system dynamics become unpredictable; for example, the small step reference response will vary depending on what transport time delay exists when the small step reference is applied to the system.

An example of a microprocessor based digital control arrangement for controlling the firing of a thyristor can be found in U.S. Pat. No. 4,577,269 which issued on Mar. 18, 1986 to A. Abbondanti. In this patent a microprocessor is used to implement sequential thyristor firing at selected delay angles. A numerical master ramp count supplied to the microprocessor by a first timer at the AC fundamental frequency is effective such that individual ramp counts are calculated, these individual ramp counts relating to the individual thyristors to be fired in sequence. The microprocessor calculates the number of units of time needed until a zero count on the individual ramp is reached, the microprocessor performing this function by comparing a delay angle reference count to the individual ramp count. A second timer is also utilized and is preset to an initial count equal to the calculated number of units of time. When the second timer is run to countdown, the next to be fired thyristor is fired. Though effective for its intended purpose of sequentially firing thyristors for a solid state AC-DC converter system, the arrangement of this invention could prove to be quite costly and, because of the two-timer arrangement, cumbersome to implement for the purpose of optimizing the transport time delay associated with the drive control system.

SUMMARY OF THE INVENTION

It is therefore an object of this invention to provide an arrangement for optimizing the thyristor power supply transport time delay of a microprocessor-based digital drive control system. It is a further object of this invention to achieve such transport time delay optimization by utilizing to separate gate interrupt subroutines, one of which calculates a coarse gate angle and the other of which calculates a finite gate angle adjustment just prior to the gating of the thyristor.

With this object in mind, the present invention provides an arrangement for optimizing the thyristor supply transport time delay of a microprocessor-based digital drive control system which comprises the thyristor power supply itself, including a plurality of thyristors fired in a sequentially controlled manner. Also included in the transport time delay optimizing arrangement is a means for calculating the gate firing angle of the one of the thyristors of the power supply that is to be fired next, such calculation being performed at a first predetermined time following the gating of a previous one of the plurality of thyristors. In a manner similar to the operation of the calculating means, a recalculating means recalculates the same gate firing angle as the calculating means but at a second predetermined time which occurs just prior to the gating of that particular thyristor. The transport time delay optimizing arrangement further includes a means for preventing the calculation performed by the calculating means from overriding the implementation of the recalculated gate firing angle generated by the recalculating means.

The present invention further includes means for determining a fresh sampling time for each calculation of the gate firing angle, such determination being made as a function of the difference between the previous two successive thyristor gate firings.

DESCRIPTION AND OPERATION

Figure 1A:
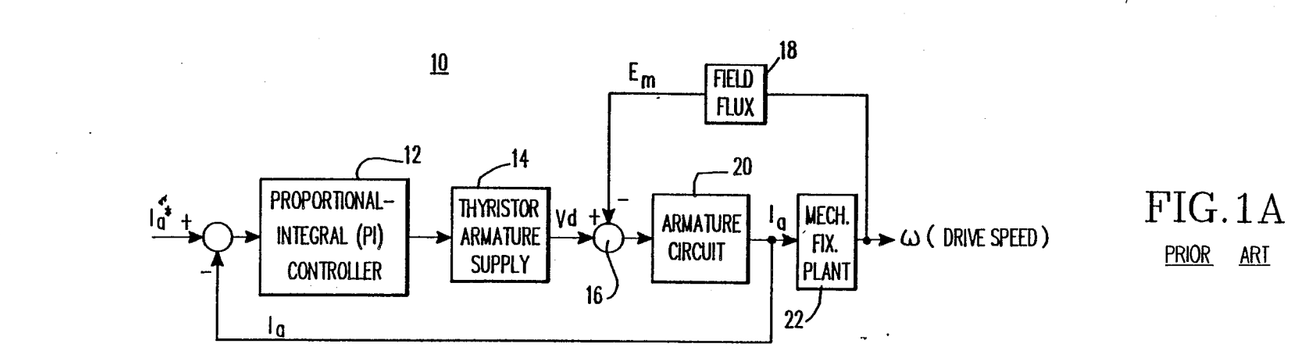
FIG. 1A shows a conventional analog drive control arrangement for current regulation.
Figure 2:
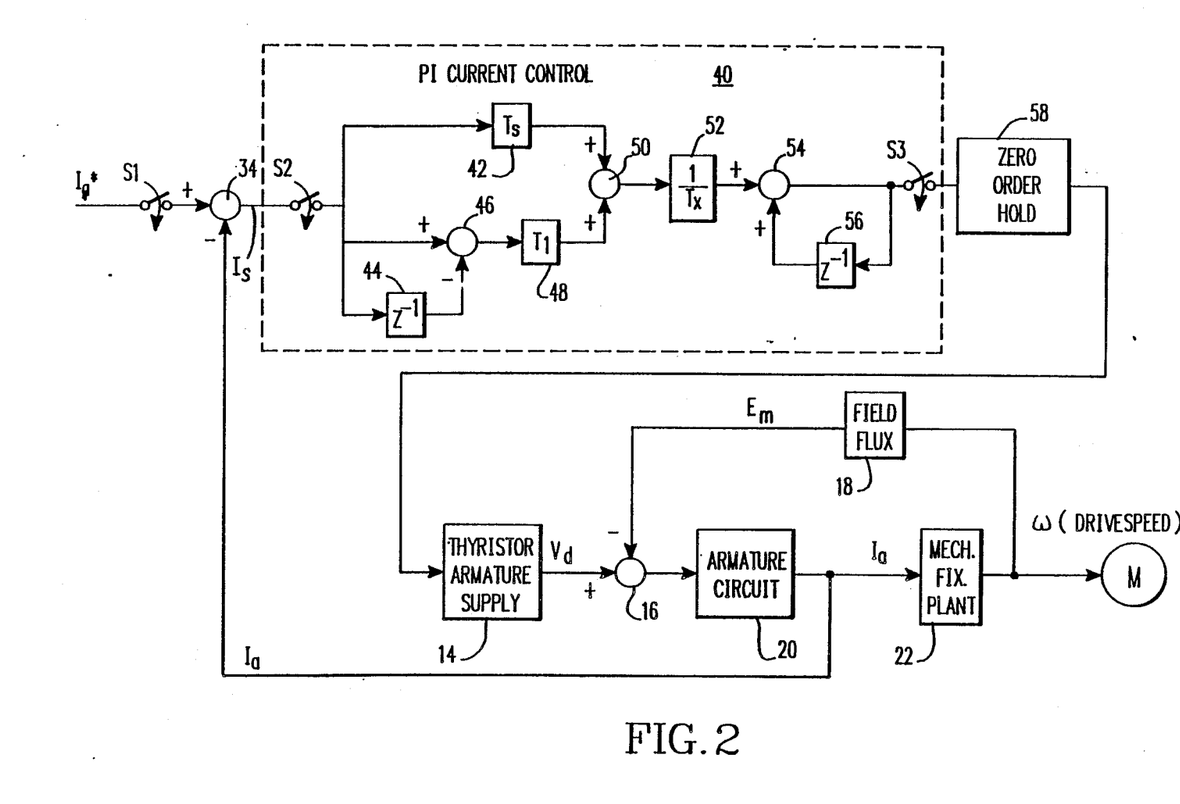
FIG. 2 shows a digital drive control of present invention.

Before discussing the description and operation of the present invention, a brief description of a prior art analog drive control arrangement will be presented. As seen in FIG. 1a, an analog drive control arrangement includes the current regulator arrangement, shown generally as reference No. 10, which utilizes a current reference signal $I_a^*$ in conjunction with the feedback armature current value $I_a$ to derive the signal presented to a proportional integral (hereinafter PI) current controller 12. It should be noted that the current reference signal $I_a^*$ is generated by a conventional speed controller (not shown) which continuously monitors the speed of the motor (see FIG. 2) and generates the current reference signal $I_a^*$ as a function thereof. The transfer function of the PI controller 12 shown in FIG. 1a is $$((1+T_1 s)/T_X s) K_c \qquad (1)$$

where:
s = LaPlace operator (1/sec.)
$T_1$ = current controller lead time constant (sec.)
$T_X$ = current controller integrator time constant (sec.)
$K_c$ = current controller per unitizing gain The output of the PI controller 12 is electrically coupled to a conventional thyristor armature supply (TAS) arrangement 14 which has associated therewith, the following transfer function:

$$K_v \times e^{T_d s} \qquad (2)$$

where:
$K_v$ = TAS static gain (V/V$_1$)
$T_d$ = TAS transport time delay (v sec.)

The output of the TAS device 14 expressed in terms of per unitizing volts $V_d$ is communicated to one input of a summing device 16. The other input to summing device 16 is a per unitized back EMF value $E_m$ which is developed by field flux element 18 from the per unitized drive speed reading $\omega$. The summed voltage value output from summing device 16 is electrically coupled to a conventional armature circuit 20 which develops therefrom, the per unitized armature current value $I_a$ previously discussed. The transfer function of the armature circuit is:

$$(1/D) / (1 + T_a s) \qquad (3)$$

where:
D = armature circuit Droop (per unit)
$T_a$ = armature circuit time constant (sec.)

The armature current $I_a$ output from the armature circuit 20 in addition to being fed back for summing with the current reference signal $I_a^*$, is electrically coupled to the mechanical fixture plant 22 where the drive speed $\omega$ is developed as function of the following relationship:

$$D/T_o s \qquad (4)$$

where:
$T_o$ = drive mechanical time constant (sec.)

Figure 1B:
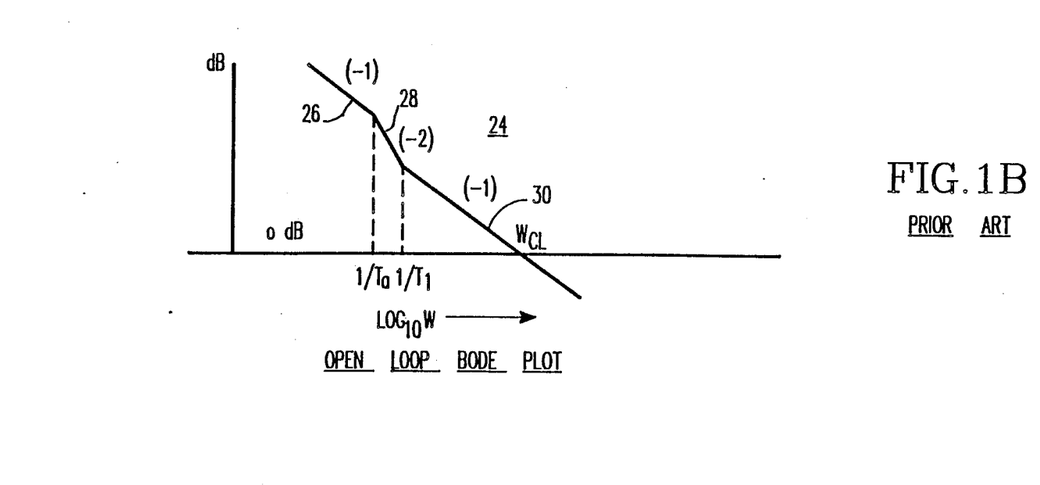
FIG. 1B shows an open loop Bode plot of FIG. 1A.

The performance characteristics of the analog current regulator arrangement shown in FIG. 1a can best be understood with reference to the open loop Bode plot shown in FIG. 1b. FIG. 1b illustrates the log magnitude curve 24 associated with the overall transfer function of the analog current regulator arrangement of FIG. 1a. Generally, it can be seen that the log magnitude curve, in the frequency range 26 prior to the frequency associated with the current controller lead time $T_1$, has a slope of $(-1)$ corresponding to a transfer function having the properties of a (1/s) operator, such slope occurring as a result of the contribution of the transfer function of the mechanical fixture plant 22 shown in FIG. 1a. At the frequency $(1/T_a)$, the log magnitude curve begins a segment 28 having a slope of $(-2)$ corresponding to the operation of the PI controller 12 which has the further effect of forming a (1/s) or integral operation. Upon the occurrence of the frequency $(1/T_1)$, the log magnitude curve 24 begins a portion 30 having slope which increases to a $(-1)$ again due to the contribution of the armature circuit 20 which has associated therewith, a LaPlace operator (s).

As previously discussed, there are certain inherent limitations in the operation of an analog drive control system which utilizes a thyristor power supply as a source of armature currents to the motor 32 (as shown in FIG. 2). A digitally based drive control arrangement, in addition to providing the inherent advantage of flexibility in adjusting controller parameters, can be configured according to the present invention as illustrated in FIG. 2, to achieve an improved transport time delay associated with the firing of the thyristors (not shown) which make up the thyristor armature supply (TAS) 14.

A digital drive control arrangement includes a current controller arrangement as illustrated in FIG. 2, such current controller utilizing a current reference signal $I_a^*$ in conjunction with the feedback armature currents $I_a$ much the same as is described in relation to the analog current controller shown in FIG. 1a.

Similar to FIG. 1a, the current reference signal $I_a^*$ and the feedback armature current $I_a$ are summed in a summing elements 34 prior to being electrically coupled to the PI controller, shown in FIG. 2 as reference No. 40. With a digital current control arrangement, and particularly one utilizing a microprocessor (not shown) to achieve such control, the performance of this current summing operation can be done on a selective basis. For this reason, FIG. 2 includes a representation of a first sampling operation, shown for purposes of illustration as switch S1, which represents the occurrence of a sampling operation whereby the program of the microprocessor is configured so as to read the current reference signal $I_a^*$ at specific predetermined time intervals as will be described hereinafter in further detail with reference to the flow charts shown in FIGS. 3 through 5.

The summed current value output from the summing device 34 is electrically coupled to the PI controller 40 in such a manner that the performance of the gate firing angle calculation is done on a selective basis under program control. This selectivity is achieved by use of a second sampling operation, illustrated within a dashed line block of FIG. 2 by switch S2. Again it should be understood that switch S2 merely represents the programming capability of the sampling operation, the occurrence of which will be discussed relative to the flow charts of FIGS. 3 through 5.

With the second sampling operation in effect, as represented by switch S2 when it is in a closed position, the PI controller 40 can perform the calculation of the gate firing angle for the next thyristor to be fired. The PI controller 40 performs such calculation by operation of the control devices illustrated within the dashed line block of FIG. 2. In this block, the summed current value output $I_s$ from the first summing device 34 is fed through an upper path to a control block 42 which has associated therewith, the function $T_s$ (sampling time in sec.). With this operation, the sampling time $T_s$, which is the time interval between updates of the PI controller 40 and which varies in duration depending on the timing of successive thyristor gate firings, is factored into the calculation of the gate firing angle for the next to be fired thyristor. The sampling time $T_s$ can be defined as the measured time between two successive updates of the PI controller 40 and as such, it should be understood that the sampling time will vary during transient periods when the thyristor gate firing angle is changing. A fixed timing interrupt is also provided and is effective for updating the current reference ramp function generator (not shown) every 2.78 msec in order to generate the current reference signal $I_a^*$.

Because of the need to optimize the transport time delay so as to achieve a more timely firing of the thyristors, it is evident that consideration must be given to the fact that, in actual practice, the sampling time is not the constant 2.78 msec for every calculation that the prior art presumes in the performance of firing angle calculations. In order to perform the proper calculation of the firing angle, the precise sampling time must be used in the transfer function, and such precise sampling time can only be provided if it is calculated for every occurrence of a firing angle determination.

The summed current value $I_s$ is also fed along a lower path of the PI controller 40 to a function block 44 having the following transfer function associated therewith:

$$1/Z = e^{-T_s S} \tag{5}$$

where such transfer function also makes use of the results of the calculation of the sampling time $T_s$. The output of the 1/Z function block 44 represents the previous input or update results which have been memorized by this function block so as to be utilized here in being coupled to a second summing device 46 where this value is summed with the summed current value $I_s$ fed to the (+) input of this summing device 46 through a middle path. The output of the second summing device 46 is fed to a function block 48 having associated therewith, a transfer function determined by the current controller lead time constant $T_1$ previously discussed with regard to the PI controller 12 shown in FIG. 1a. The outputs of both the $T_1$ function block 48 and the $T_2$ function block 42 are coupled to a third summing device 50 with the resultant summation serving as the input to a function block 52 having associated therewith, the transfer function $(1/T_x)$ where $T_x$ is the current controller integrating time constant also discussed previously with regard to the PI controller 12 shown in FIG. 1a.

The PI controller 40 for the digital drive control arrangement further includes a fourth summing device 54 which sums the output of the $(1/T_x)$ function block 52 with the output of a second (1/Z) function block 56. This second (1/Z) function block 56 has as its input thereto, the output of the fourth summing device 54. The output of the fourth summing device 54, in addition to serving as the input to the second (1/Z) function block 56, is the actual output value of the PI controller 40 which is fed to a third sampling operation as represented by switch S3. The sampling operation performed by the third switch S3 allows for the selective determination of the times, following the actual calculation of the gate firing angle, when it will be necessary to make use of the gate firing angle calculated by the PI controller 40 for firing the next thyristor.

The output of the PI controller 40, when communicated through the fact that switch S3 is closed, is coupled to a zero order hold device 58 which has associated therewith, the following transfer function:

$$(1 - e^{T_s S})/T_s S \tag{6}$$

The zero order hold device 58 performs the operation of adding a storing function to the calculated gate firing angle.

The output of the zero order hold device 58 is then coupled to the thyristor armature supply (TAS) control device 14. It should be noted that the remaining elements of FIG. 2 are identical to those discussed in FIG. 1a and will operate using the same transfer functions as were previously discussed. Accordingly, these elements will utilize the same reference numbers as were used for FIG. 1a. The output of the thyristor armature supply (TAS) control device 14 is coupled to the (+) input of the summing device 16. The (-) input of summing device 16 has connected thereto, the back EMF value $E_m$ output from the field flux device 18. Following the summation of the back EMF value $E_m$ and the TAS voltage output $V_d$, the summing device 16 outputs a signal to the armature circuit 20 from which is developed the armature current $I_a$ as a function of the transfer function associated with the armature circuit 20 as was previously discussed in relation to FIG. 1a. Like the analog current controller arrangement of FIG. 1a, the armature current $I_a$ is fed to the mechanical fixture plant 22 from which the drive speed signal $\omega$ is developed.

The PI controller 40 of the digital current control arrangement of the present invention performs the calculation of the gate firing angle based on sampling times which are determined on an "as needed" basis, thereby assuring that a more accurate determination of the gate firing angle for the next to be fired thyristor. However, the PI controller 40 operation can only be effective for implementing such accurate determination of the gate firing angle if the selection of the timing operations of the PI controller 40 are coordinated under the program control as illustrated in the functional flow charts shown in FIGS. 3 through 5. Accordingly, the operation of the digital current controller arrangement of the present invention which utilizes the PI controller 40 will be described in conjunction with the description of these flow charts.

Figure 3:
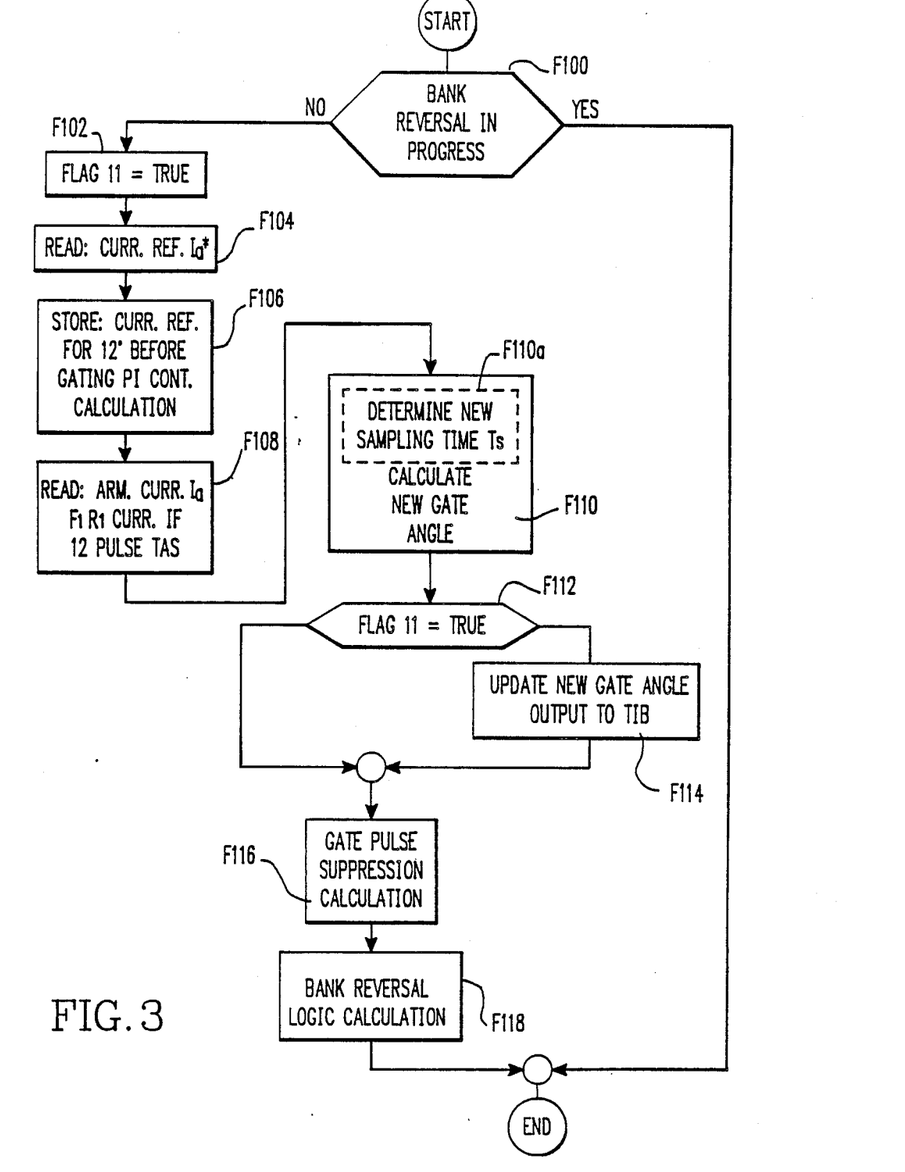
FIG. 3-5 show flow charts of control programs for the digital drive control of FIG. 2.

In operation, the program control of the digital current controller arrangement performs a first check to determine if there is a thyristor bank reversal operation being performed; that is, the microprocessor (not shown) has a programmed instruction which checks to determine if the thyristor power supply is reversing from one bank of thyristors to another, such function being performed by program function F100 shown in FIG. 3. The bank reversal check F100 must be performed prior to any gate angle calculations being performed by either of the gate interrupt subroutines to be discussed hereafter. This is so because of the fact that, during a thyristor bank reversal, gate interrupt subroutines cannot be initiated when a thyristor bank is being inhibited as occurs during a thyristor bank reversal. Thyristor bank reversal is detected when the current reference signal $I_a^*$ is of an opposite polarity to the armature current $I_a$ and the armature current $I_a$ is detected as being low which is typically on the order of less than two percent of the rated current. The operation of the program control will proceed along a path of a fixed timer interrupt when a bank reversal is in effect, this operation to be described later with reference to FIG. 5.

If the response to the bank reversal check of program function F100 is negative, that is, if a bank reversal is not in effect, the program control proceeds to check the status of flag 11, such check being performed by program function F102. Since the operation of the program control of FIG. 3 is to perform the gate angle calculation at 15 degrees after firing of the previous thyristor firing (coarse gate angle calculation), program function F102 must perform the task of ensuring that the coarse gate angle interrupt subroutine does not interfere with the performance of a finite gate angle calculation performed according to the flow chart of FIG. 4 (12 degrees before gating). It should be understood that by having the "true" designation associated with the non-preferred interrupt subroutine, a form of a failsafe operation is achieved; in other words, since the finite gate angle calculation takes preference in implementing its results in the firing of the thyristor, any failure of the setting of flag 11 would defer to the operation of the finite gate angle interrupt subroutine.

Assuming that flag 11 is true, the coarse gate angle interrupt subroutine of FIG. 3 proceeds to read the current reference signal $I_a^*$ as illustrated by program function F104. Program function F106 then performs the operation of storing this read current reference signal $I_a^*$ for use by the finite gate angle interrupt subroutine of FIG. 4. In this manner, it can be appreciated that both the coarse and finite gate angle interrupt subroutines will perform their gate angle calculations based on the same parameters. As was discussed relative to the operation of the switch S1 of FIG. 2, the performance of the reading of the current reference signal $I_a^*$ is represented as a sampling operation.

Similar to the illustration of switch S1 representing the reading of current reference signal $I_a^*$, switch S2 represents the reading of the armature currents $I_a$, which for purposes of the program operation is illustrated as program function F108 in FIG. 3. Program function F108 is described so as to define the condition of reading the armature current $I_a$ for a 12 pulse thyristor armature supply (TAS) where the designation $F_1R_1$ represents the forward thyristor, set 1/reverse thyristor, set 1 of a thyristor power supply having a forward and reverse bank of thyristors.

Having obtained the current reference signal $I_a^*$ and the armature current $I_a$, the PI controller 40 then proceeds to calculate the gate firing angle by command of the program control as illustrated in program function F110. Included as a preliminary operation to the calculation of the gate firing angle under the control of program function F110, is the operation of determining the sampling time $T_s$ which operation is illustrated as being performed by program function F110A.

Prior to updating the thyristor interface board (TIB-not shown). With the gate angle calculated under program function F110, the coarse gate angle interrupt subroutine again checks the status of flag 11 to determine that in the process of calculating the coarse gate angle, a finite gate angle interrupt operation has not been initiated. Though the likelihood of such an event occurring is insignificant, such an operation further ensures that the finite gate angle interrupt calculation will be the one implemented in the firing of the next thyristor. If the check of flag 11 as illustrated by program function F112 remains true, the calculated gate angle is communicated to the thyristor interface board (TIB) as seen by program function F114. If the response to the inquiry of program function F112 is negative, that is, if flag 11 is false indicating the operation of the finite gate angle interrupt subroutine, program control is then shifted to implement the resultant calculation of such finite gate angle interrupt subroutine. In this case, the coarse thyristor gate angle calculated in the interrupt subroutine shown in FIG. 3 will not be passed to the thyristor gate control (not shown); the thyristor gate angle calculated by the finite gate interrupt subroutine to be described with reference to FIG. 4, will control the thyristor gating angle.

Following updating of the TIB, the program control operation proceeds to perform the gate pulse suppression calculation and bank reversal logic calculation as represented in program functions F116 and F118, respectively. The operation of these two program functions F116 and F118 ensure that, following completion the coarse gate angle calculation, implementation of the actual gate firing angle is reserved for performance by fixed timer interrupt subroutine in the event of a detection of a bank reversal situation as will be discussed relative to the flow chart of FIG. 5.

Figure 4:
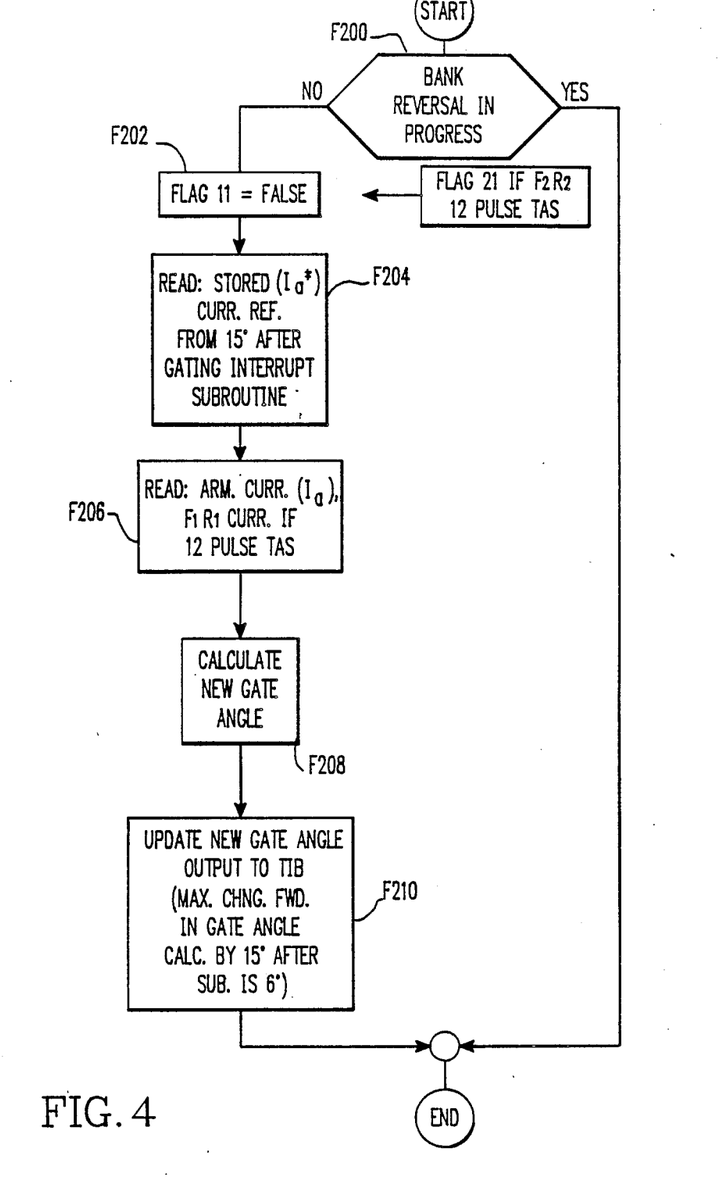

Similar to the initial functions of the coarse gate angle interrupt subroutine, the finite gate angle interrupt subroutine illustrated in FIG. 4 performs the initial operation of checking for the occurrence of a bank reversal situation as shown in program function F200. If no such bank reversal is in effect, the program proceeds to set the status of flag 11 to a false designation as illustrated in program function F202. As previously discussed, the performance of the finite gate angle interrupt subroutine occurs when it is detected that flag 11 is false. It should also be noted that an alternate check is made for the condition of a flag 21 in the event that a 12 pulse TAS system is used.

The performance of the gate angle calculation during the operation of the finite gate angle interrupt subroutine occurs using the sane current reference signal $I_a^*$ read during the coarse gate angle interrupt subroutine. For that reason, program function F204 performs the operation of reading &:he stored current reference signal $I_a^*$ from the coarse gate angle interrupt subroutine. Program function F206, performs the task of reading the armature current $I_a$ also to be used in the performance of the gate angle calculation by the PI controller 40.

Program function F208 illustrates the operation of the program by which the command is made to PI controller 40 to calculate the gate firing angle. The PI controller 40 performs this calculation using the same current reference signal $I_a^*$ as was used to calculate the gate firing angle during the coarse gate angle interrupt subroutine. The sampling time $T_s$ used in the PI controller 40 to calculate the gate firing angle is equal to the time interval between the previous and present update calculation of the gate firing angle by the PI controller 40.

The resultant calculation of the gate angle by program function F208 is then output to the TIB (not shown) under the control of program function F210. It should be noted that there is a maximum permissible change forward in the gate angle due to the inherent limitation of performing the gate angle calculation. For example, with a 12° before gating initiation of this calculation, and presuming that it takes approximately the equivalent of 6° to perform the calculation, there is only 6° remaining which can be utilized for phasing forward of the thyristor firing angle. Of course it should be recognized that the 12° before and 15° after angle selections for the timing of the performance of the interrupt subroutines are examples only and that other timing selections can be made as well that would still achieve the benefits of the present invention. Additionally it should also be recognized that there is no limitation as to the amount of the gate firing angle as to the amount that the gate firing angle can be phased back. Once the new gate angle is output to the TIB, this value is implemented for the purpose of firing the next thyristor and the operation of the coarse and finite gate interrupt subroutine can be repeated for the next thyristor to be fired.

Figure 5:
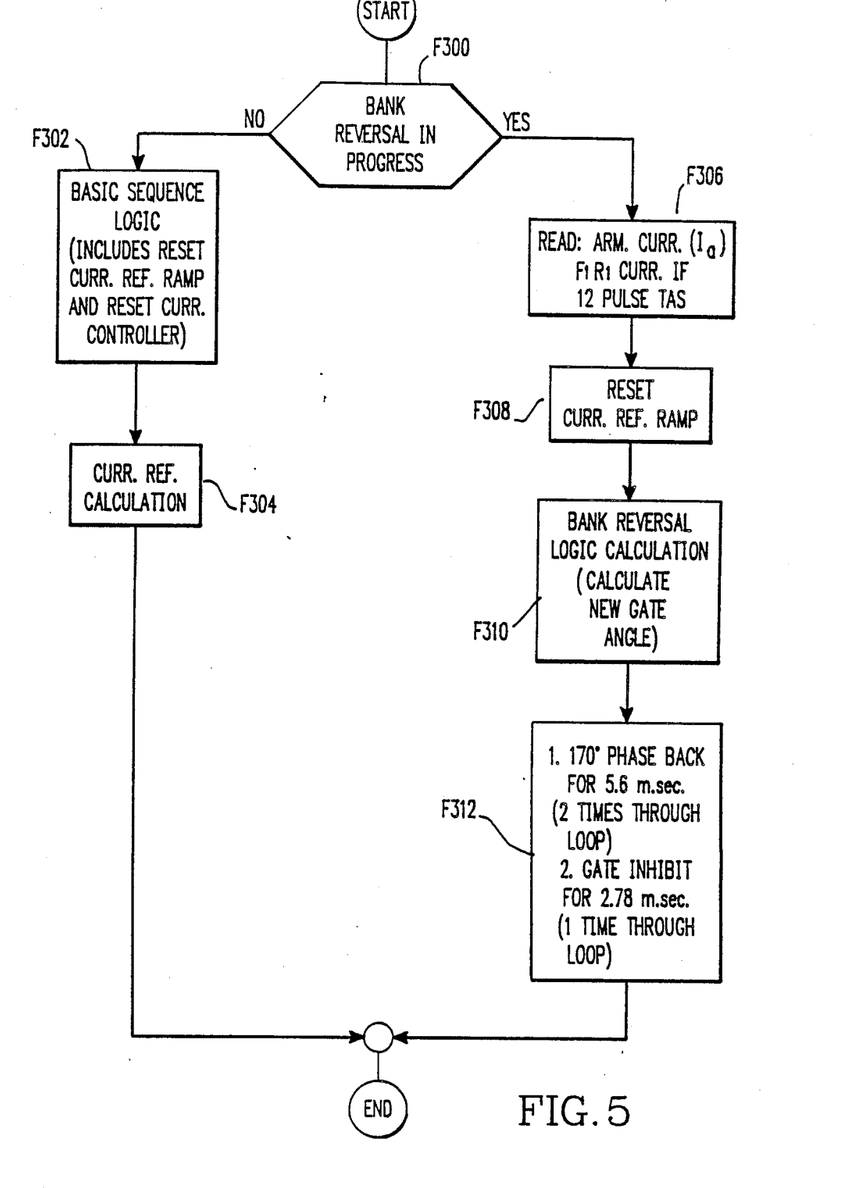

In the event that a bank reversal condition does exist, the operation of the coarse and finite gate angle interrupt subroutines is inhibited in favor of the calculations performed in the fixed timer interrupt subroutine illustrated in FIG. 5. The conditions by which a bank reversal is detected have been previously discussed and are carried out by operation of the program function F300 shown in FIG. 5. Program functions F302 and F304 which occur in response to a "no bank reversal" condition are those operations previously discussed with reference to FIGS. 3 and 4 whereas the operations in response to a positive determination of a bank reversal condition are those shown beginning with program function F306 which provides for reading the armature current $I_a$. The program operation during the fixed interrupt subroutine requires that the current reference signal $I_a^*$ used in the gate angle calculation be obtained from a reset current reference ramp as shown in program function F308.

The calculation of the gate firing angle occurs during the fixed timer interrupt subroutine under the command of program function F310, such calculation being performed by the PI controller 40 using the read value of the armature current $I_a$ taken during operation of program function F306 and the current reference signal $I_a^*$ taken during operation of program function F308. It should be noted however that such calculation does not recalculate a new sampling time $T_s$ during the fixed timer interrupt subroutine but instead uses the fixed value of 2.78 msec for the performance of such calculation.

When a thyristor bank reversal is underway, the fixed timer interrupt subroutine is effective such that the gating angle of the thyristor bank being turned "off" is set at 170° for a duration of 5.6 msec after the current is forced to a low value (typically less than two percent of rated current) by the PI controller 40. This feature is illustrated in program function F312 and ensures that the current in the thyristor bank being turned off is zero amperes when the opposite thyristor bank is being turned "on". A second operation performed by program function F312 during a thyristor bank reversal is to inhibit a thyristor gate firing as would otherwise be generated by the coarse and finite gate angle interrupt subroutines, such gating inhibits lasting for one pass through the loop of the fixed timer interrupt subroutine, that is, for 2.78 msec. Since the thyristor bank reversal is complete when the opposite bank is gated to a preset gate angle, the coarse and finite gate interrupt subroutines can resume operations immediately thereafter. During the time that the bank reversal is in progress, however, the thyristor gate angle calculation is made by the fixed interrupt timer subroutine. Upon completion of program function F312, the fixed timer interrupt subroutine is ended so that the gate angle calculations can be performed by the coarse finite gate angle interrupt subroutines for the next to be fired thyristor.

Figure 6:
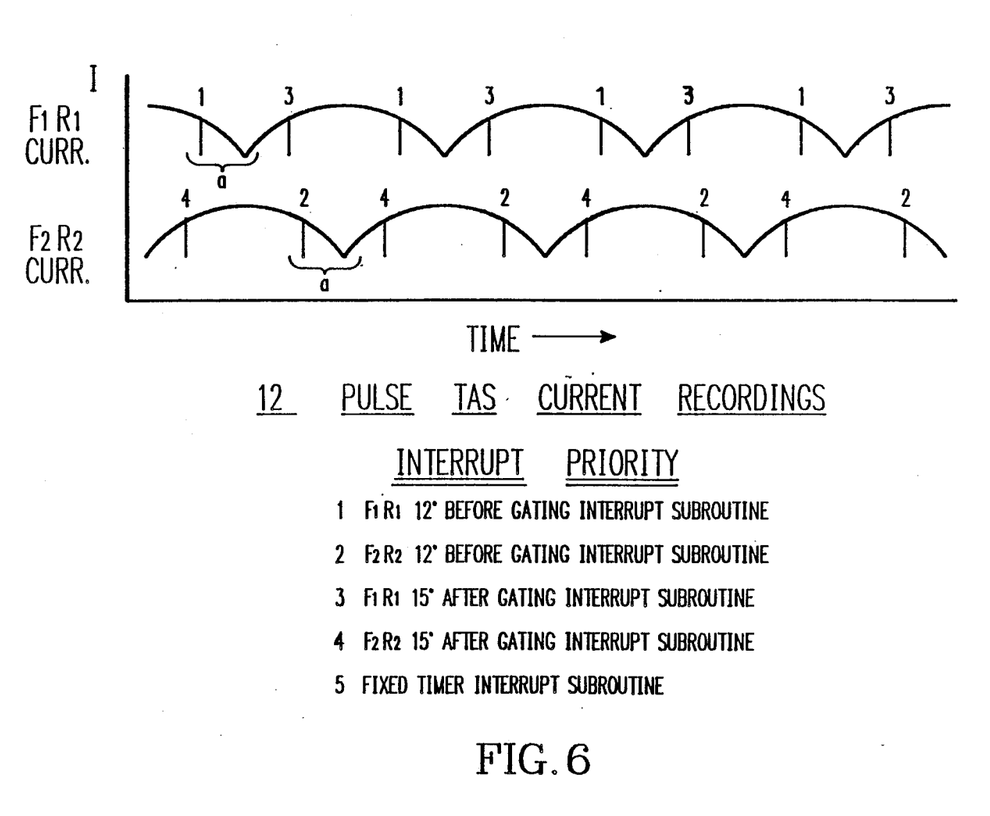
FIG. 6 shows converter current traces of the digital drive control of the present invention.

FIG. 6 illustrates a converter current trace (oscilloscope reading) and depicts where the gate angle interrupts occur relative to the magnitude of the thyristor current (either $F_1R_1$ for a 6 pulse system or $F_2R_2$ for a 12 pulse system, where $F_2R_2$ is the forward thyristor, second set/reverse thyristor, second set). From this illustration, it can be seen that the transport time delay dictates the ability of the drive control system to provide a uniform current for the operation of the motor. By noting that the transport time delay is the distance from the occurrence of the 12° before gating interrupt to the increase in the current magnitude (designated by (a) in FIG. 6), it can be seen that by minimizing this time delay, a more desirable result is achieved.

As previously discussed, a flag transfer is utilized between the 15° after firing and the 12° before firing subroutines to ensure that priority is given to the finite gate angle interrupt subroutine. It can be further seen from FIG. 6 that the likelihood of there being a contention between these two subroutines is insignificant. Additionally, at steady state it can be seen that there will be no contention between the two 12° before gating subroutines for the 12 pulse TAS system since these two subroutines are 30° apart (1.39 msec) and that since it takes approximately 3/10 of a msec to calculate a gate firing angle, it would require a 22° consecutive change in the gate firing angle before there would be a contention between these two subroutines during a transient condition.

Although the above discussion describes the preferred embodiment of the invention, it can be appreciated that modifications can be made thereto about departing from the scope of the invention set forth in the appended claims.

What is claimed is:

1. An arrangement for optimizing a transport time delay associated with a thyristor power supply which is effective for supplying power to a motor, said optimizing arrangement comprising:

said thyristor power supply including a plurality of thyristors which are fired in a sequentially controlled manner so as to produce such power to said motor;

means for calculating a gate firing angle for a next one of said plurality of thyristors, said calculating means performing such calculation at a first predetermined time following gating of a previous one of said plurality of thyristors;

means for recalculating said gate firing angle at a second predetermined time just prior to gating of said next one of said plurality of thyristors; and means for preventing such calculated gate firing angle of said calculating means from overriding such recalculated gate firing angle produced by said recalculating means.

2. A thyristor power supply transport time delay optimizing arrangement as set forth in claim 1 further comprising means for controlling the performance of said calculating means and said recalculating means, said controlling means being effective so as to direct that said calculating means and said recalculating means operate using the same measurement of current value flowing through said motor and that such operation occurs utilizing a sampling time which is refreshed for each operation of said calculating means and said recalculating means.

3. A thyristor power supply transport time delay optimizing arrangement as set forth in claim 2 wherein said sampling time is: determined as a function of a previous timing value taken when said controlling means was updated and a next timing value taken when said controlling means gate angle calculation is updated.

4. A thyristor power supply transport time delay optimizing arrangement as set forth in claim 2 wherein said preventing means includes a digital representation of a flag which is passed between said calculating means and said recalculating means.

5. A thyristor power supply transport time delay optimizing arrangement as set forth in claim 2 wherein said controlling means further includes means for performing a backup calculation of said gate firing angle within a fixed time interval independent of said sampling time, said performing means being effective for implementing said backup calculation of said gate firing angle upon said controlling means sensing the occurrence of a reversal in operation between a first and a second bank of said plurality of thyristors.

6. A thyristor power supply transport time delay optimizing arrangement as set forth in claim 5 wherein said controlling means senses the occurrence of such thyristor bank reversal when a current reference value is detected as being of an opposite polarity as said measured current value and said measured current value is detected as being below a predetermined low threshold value.

7. A thyristor power supply transport time delay optimizing arrangement as set forth in claim 5 wherein said controlling means is further effective for disabling one of said first and second banks of said plurality of thyristors upon sensing such reversal condition.

8. A thyristor power supply transport time delay optimizing arrangement as set forth in claim 5 wherein said backup calculation of said gate firing angle is made during said fixed time interval at approximately the same intervals relative to the firing of said next thyristor as said calculating means and recalculating means perform respectively.

9. A thyristor power supply transport time delay optimizing arrangement as set forth in claim 2 wherein said controlling means is further effective for imposing an upper limit or the amount that said gate firing angle can be phased forward as a result of the operation of said recalculating means.

10. A drive control arrangement for a motor powered by a thyristor power supply comprising:

means for sensing a current reference value representative of a desired speed for said motor;

means for determining a measured flow of current in said motor;

means for calculating a gate firing angle for a next one of a plurality of thyristors which form said thyristor power supply, said calculating means calculating said gate firing angle as a function of said current reference value and said measured current flow;

said calculating means further effective for determining a sampling time which is utilized in the performance of said gate firing angle calculation, said sampling time being representative of the difference between the occurrence of a timing measure taken during the calculation of a last gate firing angle for a previous one of said plurality of thyristors and a timing measure taken during the calculation of a present gate firing angle for said next one of said plurality of thyristors;

said calculating means further being effective such that said calculation of said gate firing angle is performed in at least a first and a second stage wherein said first stage occurs at a predetermined time following the firing of said previous one of said plurality of thyristors and said second stage occurs at a second predetermined time just prior to the gating of said next one of said plurality of thyristors; and means for recalculating said gate firing angle such that said next one of said plurality of thyristors is fired thereby.

11. A drive control arrangement as set forth in claim 10 further comprising:

means for controlling the performance of said calculating means and said recalculating means, said controlling means being effective so as to direct that said calculating means and said recalculating means operate using the same measurement of current value flowing through said motor and that such operation occurs utilizing a sampling time which is refreshed for each operation of said calculating means and said recalculating means;

said controlling means further includes means for performing a backup calculation of said gate firing angle within a fixed time interval independent of said sampling time, said performing means being effective for implementing said backup calculation of said gate firing angle upon said controlling means sensing the occurrence of a reversal in operation between a first and a second bank of said plurality of thyristors.

12. A drive control arrangement as set forth in claim 11 wherein said controlling means senses the occurrence of such thyristor bank reversal when a current reference value is detected as being of an opposite polarity as said measured current value and said measured current value is detected as being below a predetermined low threshold value.

13. A drive control arrangement as set forth in claim 11 wherein said controlling means is further effective for disabling one of said first and second banks of said plurality of thyristors upon sensing such reversal condition.

14. A drive control arrangement as set forth in claim 11 wherein said backup calculation of said gate firing angle is made during said fixed time interval at approximately the same intervals relative to the firing of said next thyristor as said calculating means and recalculating means perform respectively.

15. A method of optimizing a transport time delay associated with a thyristor power supply operable to supply power to a motor, said optimizing method comprising the steps of:
   determining a sampling time representative of the difference between a previous two gate angle calculations associated with two successive gate firings of a plurality of thyristors associated with the thyristor power supply;
   calculating a gate firing angle as a function of such sampling time, said calculating step being performed for a next one of the thyristors associated with the thyristor power supply at a first predetermined time following gating of the previously fired thyristor associated with the thyristor power supply;
   recalculating such gate firing angle for the next one of the thyristors at a second predetermined time just prior to the gating of such next one of the thyristors associated with the thyristor power supply; and
   implementing such recalculated gate firing angle such that the time between operation of said recalculating step and said implementing step is minimized.

16. A transport time delay optimizing method as set forth in claim 15 further comprising the step of:
   performing a backup calculation of said gate firing angle within a fixed time interval independent of said sampling time; and
   implementing said backup calculation of said gate firing angle upon a control means sensing the occurrence of a reversal in operation between a first and a second bank of said plurality of thyristors.

17. A transport time delay optimizing method as set forth in claim 16 further comprising the step of:
   sensing the occurrence of such thyristor bank reversal when a current reference value is detected as being of an opposite polarity as a measured current value and said measured current value is detected as being below a predetermined low threshold value.

* * * * *

UNITED STATES PATENT AND TRADEMARK OFFICE
CERTIFICATE OF CORRECTION

PATENT NO. : 4,982,145
DATED      : January 1, 1991
INVENTOR(S) : Robert S. Peterson It is certified that error appears in the above-identified patent and that said Letters Patent is hereby corrected as shown below:

Column 2, line 57, "to" should be --two--.
Column 3, line 26, "FIG." should be --FIGS.--.
COlumn 7, line 26, after the word "reversal" insert --.--
Column 9, line 8, "&:he" should be --the--.
Claim 3, column 11, line 40, delete ":".
Claim 9, column 12, line 14, "or" should be --on--.

Signed and Sealed this

Seventh Day of September, 1993

Attest:

BRUCE LEHMAN

Attesting Officer    Commissioner of Patents and Trademarks